US007382365B2

(12) United States Patent
Matsugi et al.

(10) Patent No.: US 7,382,365 B2
(45) Date of Patent: Jun. 3, 2008

(54) SEMICONDUCTOR DEVICE AND DRIVER

(75) Inventors: Toru Matsugi, Takatsuki (JP); Toru Suyama, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 700 days.

(21) Appl. No.: 10/835,057

(22) Filed: Apr. 30, 2004

(65) Prior Publication Data

US 2004/0217936 A1 Nov. 4, 2004

(30) Foreign Application Priority Data

May 2, 2003 (JP) ............................ 2003-126812

(51) Int. Cl.
*G06F 3/038* (2006.01)
*G09G 5/00* (2006.01)
*G09G 3/36* (2006.01)

(52) U.S. Cl. ........................ 345/212; 345/87; 345/103; 345/204; 345/211

(58) Field of Classification Search .................. 345/55, 345/87, 98, 99, 100, 103, 204, 211, 212
See application file for complete search history.

(56) References Cited

U.S. PATENT DOCUMENTS 5,157,386 A * 10/1992 Uchida et al. ................ 345/89
5,764,205 A * 6/1998 Doyle et al. ............... 345/74.1
6,963,325 B2 * 11/2005 Yano et al. .................... 345/94
2002/0044152 A1 4/2002 Fukuda ....................... 345/204

FOREIGN PATENT DOCUMENTS

JP 2001-255859 9/2001

* cited by examiner

*Primary Examiner*—My-Chau T. Tran
(74) *Attorney, Agent, or Firm*—Steptoe & Johnson LLP

(57) ABSTRACT

A semiconductor device and driver capable of adequately suppressing generation of a potential difference between drive signals output by liquid crystal display drivers, and suppressing variation in display output between liquid crystal display blocks of a liquid crystal display unit by balancing the drive performance of each liquid crystal display driver with respect to the liquid crystal display unit. Because control is performed to turn ON corresponding switching means only during drive operation of the liquid crystal display drivers to turn ON the switching means only for the liquid crystal display drivers whose drive operation has started, power is supplied via the switching means to the drive supply line of each liquid crystal display driver only from the transmission supply line of the liquid crystal display driver during drive operation. Hence voltages of the drive supply lines of the liquid crystal display drivers are held at substantially the same potential.

13 Claims, 5 Drawing Sheets

SEMICONDUCTOR DEVICE AND DRIVER

BACKGROUND OF THE INVENTION

1. Field of the Invention

The present invention relates to a semiconductor device that comprises a plurality of drivers that drive, for example, a liquid crystal display unit of a liquid crystal display device as a load by means of a drive signal, and to a driver, for example.

2. Description of the Related Art

Normally, in a liquid crystal display device that comprises a matrix color liquid crystal panel, for example, as a liquid crystal display unit, a scanning line driver, which drives the liquid crystal panel scanning lines, and a signal line driver, which drives the signal lines, are provided as the liquid crystal panel drivers that drive the liquid crystal panel.

These liquid crystal panel drivers are mounted by means of the COG method on the same substrate as the liquid crystal panel to form a semiconductor-device integrated circuit. For example, in the case of the semiconductor device that constitutes the scanning line driver, for a single liquid crystal panel, a plurality of liquid crystal display drivers, which drive the respective liquid crystal display blocks formed as blocks in a plurality of rows of the scanning lines, is arranged and cascade-connected so that the respective supply wires of these liquid crystal display devices are sequentially connected.

The conventional semiconductor device above will be described hereinbelow with reference to the drawings.

FIG. 1 is an equivalent circuit diagram showing the constitution of a liquid crystal display device that uses a conventional semiconductor device. As the conventional semiconductor device, a case where a plurality of liquid crystal display drivers mounted by means of the COG method is constituted by means of a cascade connection is shown.

In the case of the semiconductor device shown in FIG. 1, arranged in the liquid crystal display device 1, whose liquid crystal display unit 2 is the load, is a plurality of liquid crystal display drivers (1) 3-1 to (N) 3-*n*, which are each connected to drive each liquid crystal display block of liquid crystal display blocks (1) 2-1 to (N) 2-*n* that are operationally separated to form a plurality. Each liquid crystal display driver 3 is formed having an output terminal 4 that outputs a drive signal for driving the liquid crystal display blocks of the liquid crystal display unit 2 (although not illustrated, this output terminal comprises a drive unit that generates a drive signal), and a drive supply line 5, which is supply wiring, for supplying a power supply (A, B) 6 allowing the drive unit to generate a drive signal. These liquid crystal display drivers 3 are cascade-connected such that the drive supply lines 5 are sequentially connected via wire wound resistors R, and, as a result of the mutual cascade connection between the liquid crystal display drivers, the power supply (A, B) 6 is supplied to the subsequent-stage liquid crystal display drivers via the wirewound resistors R between the liquid crystal display drivers.

Further, the internal constitution of the conventional liquid crystal display driver is shown in FIG. 5. A clock signal 7, an operation start signal 8, a power supply (A) 6A, a power supply (B) 6B, and another plurality of input signals 9 are input to the liquid crystal display driver 3. The input signals 9 and supplies (A, B) 6 are also transmitted as signals by means of the cascade connection. In the case of this liquid crystal display driver 3, when the clock signal 7 and operation start signal 8 are input to a shift register 10, the operation start signal 8 is sequentially transferred to the shift register 10 in accordance with the timing of the clock signal 7.

The output of the shift register 10 is input to a level shifter 11 and converted to an amplitude signal that is determined by the respective potentials of the power supply (A) 6A and power supply (B) 6B. When the row electrodes in the scanning line direction of the liquid crystal display unit 2 are driven, the potential of the power supply (A) 6A is individually output in sequence by the respective output terminals 4 arranged in the liquid crystal display driver 3. Then, the potential of the power supply (B) 6B is output to the liquid crystal display unit connected outside the driven rows. Subsequently, when the drive voltage output from all the output terminals 4 sequentially arranged is complete, an operation end signal 12 is output. The operation end signal 12 is the operation start signal of the subsequent-stage liquid crystal display driver when a cascade connection is in place.

In the case of this conventional liquid crystal display driver 3, when the liquid crystal display unit is driven, a precharge/discharge current of a liquid crystal capacitance Y1 generated by the liquid crystal element shown in FIG. 1 flows sequentially to the power supply (B) 6B via each output terminal 4.

Further, in the case of conventional semiconductor devices, which drive the liquid crystal display blocks of the liquid crystal display unit 2 by means of the respective liquid crystal display drivers 3 by cascade-connecting a plurality of the liquid crystal display drivers 3, as shown in FIG. 3A, each drive supply line 5 is sequentially connected via wirewound resistors R between the liquid crystal display drivers 3. Hence, when a precharge/discharge current I of the liquid crystal capacitance Y1 generated by each liquid crystal element forming the liquid crystal display unit 2 flows, an output-voltage potential difference $\Delta V(=I \cdot R)$ is generated across A and B, and C and D of the liquid crystal display drivers 3, as shown in FIG. 3B.

Because this potential difference $\Delta V$ is generated, the potential of the power supply (B) 6B, which is the power supply when no driving is taking place, is nonuniform in the liquid crystal display drivers 3, and hence a display variation, which arises from a display variation of the undriven liquid crystal display unit between the liquid crystal display blocks of the liquid crystal display unit 2 (a phenomenon according to which, although the liquid crystal display is dark when no drive is taking place, this darkness is subject to a variation), is generated, there is the problem that a striped pattern is produced on the display screen.

SUMMARY OF THE INVENTION

The present invention resolves the conventional problems, an object thereof being to provide a semiconductor device and driver that make it possible to suppress the generation of a potential difference between liquid crystal display drivers that arises from a precharge/discharge current that flows from a liquid crystal capacitance in the driven liquid crystal display unit when liquid crystal display blocks are driven by the liquid crystal display drivers by cascade-connecting a plurality of liquid crystal display drivers, that make it possible to suppress a display variation between the liquid crystal display blocks of the liquid crystal display unit by causing each liquid crystal display driver to output the same potential to an undriven liquid crystal display unit.

The semiconductor device of the present invention is a semiconductor device having a plurality of drivers for outputting a drive signal for driving a load, the plurality of drivers being sequentially connected, the semiconductor device comprising: a first supply wiring that is wired such that the plurality of drivers are sequentially cascade-connected; a second supply wiring that is wired such that the plurality of drivers are sequentially cascade-connected and that supplies a power supply to the first supply wiring; and switching means that is provided in at least two of the plurality of drivers and that turn ON and OFF the connection between the first supply wiring and second supply wiring, wherein, of the at least two drivers, only the switching means provided in the driver during drive operation is turned ON.

Further, the semiconductor device of the present invention is constituted such that the whole plurality of drivers comprises the switching means.

In addition, the drivers disposed at the two ends of the cascade connection are constituted such that the end of the first supply wiring is open.

Further, the semiconductor device of the present invention is constituted to comprise a power supply wiring for supplying a power supply to the second supply wiring of at least one of the plurality of drivers.

Furthermore, in the semiconductor device, the first supply wiring and the second supply wiring comprise resistive components, respectively, in the region of the connection between the drivers.

Still further, in the semiconductor device, the at least two drivers provided with the switching means comprise a drive unit that is connected to the first supply wiring and generates the drive signal in accordance with the supply voltage supplied to the first supply wiring via the second supply wiring and the switching means.

Still further, in the semiconductor device, the switching means includes a semiconductor switching element.

According to this constitution, when load blocks are driven by cascade-connecting at least two drivers, because only the switching means provided in the driver during the drive operation is turned ON, the current flowing from the driven load does not flow between the drivers. Hence, the first supply wiring is held at the same potential.

In addition, the driver of the present invention is a driver that outputs a drive signal for driving a load, the driver comprising: a first supply wiring for directly supplying a drive-signal output supply; a second supply wiring for supplying the power to obtain the drive-signal output supply to the first supply wiring; and switching means that turns ON and OFF the connection between the first supply wiring and the second supply wiring.

In this driver of the present invention, the switching means includes a semiconductor switching element.

Further, the driver of the present invention is constituted to further comprise a drive unit that is connected to the first supply wiring and generates the drive signal in accordance with the supply voltage supplied to the first supply wiring via the second supply wiring and the switching means.

In the driver of the present invention, the switching means is turned ON in accordance with an instruction to output the drive signal.

Further, in the driver of the present invention, the first supply wiring is constituted to provide a direct connection between a first open terminal and a second open terminal that are formed in positions spaced apart within the driver that neighbor the two ends thereof.

Furthermore, in the driver of the present invention, the second supply wiring is constituted to provide a direct connection between a first supply terminal and a second supply terminal that are formed in positions spaced apart within the driver that neighbor the two ends thereof.

As detailed hereinabove, by fabricating a semiconductor device that comprises a plurality of drivers thus constituted, when load blocks are driven by cascade-connecting at least two drivers, because only the switching means provided in the driver during the drive operation is turned ON, the current flowing from the driven load does not flow between the drivers. Hence the first supply wiring is held at the same potential.

As described above, the first supply wiring having an open terminal at the two ends thereof, and the second supply wiring, are connected by switching means and at least two drivers are cascade-connected so that the respective supply wirings are sequentially connected. When the load is driven by these drivers, because only the switching means provided in the driver during the drive operation is turned ON, the drive supply lines can be held at the same potential.

For this reason, when the load is a liquid crystal display unit comprising a plurality of blocks in a liquid crystal display device, because the same non-drive potential can be supplied to all of the undriven liquid crystal display unit, it is possible to suppress variation in the image display arising from the display variation in the liquid crystal display unit when no drive is taking place.

DESCRIPTION OF THE PREFERRED EMBODIMENTS

A semiconductor device and driver that represent the embodiment of the present invention will be described specifically hereinbelow with reference to the drawings.

Figure 1:
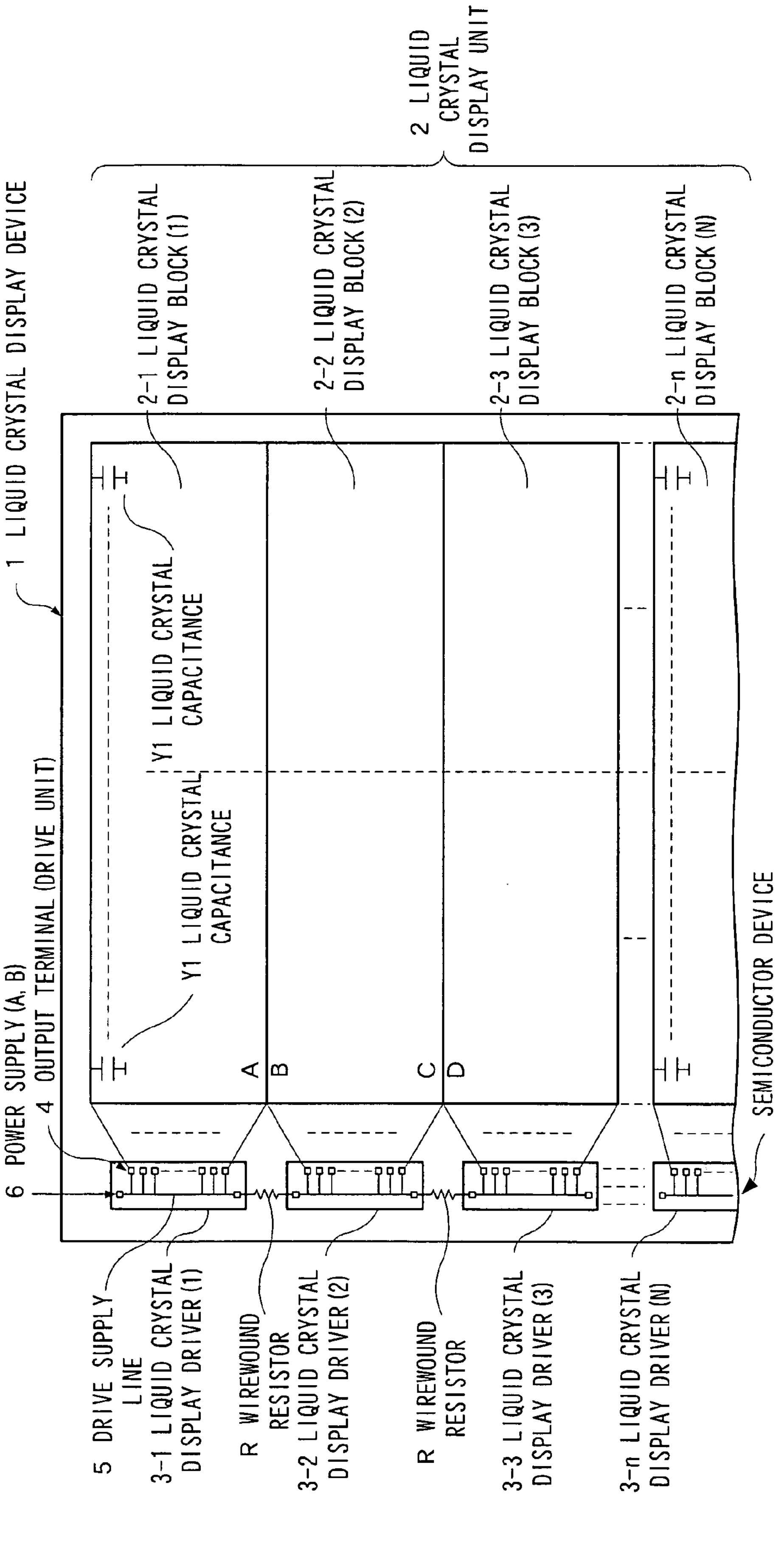
F I G. 1 PRIOR ART
FIG. 1 is an equivalent circuit diagram showing a constitution of a liquid crystal display device that uses a conventional semiconductor device.
Figure 2:
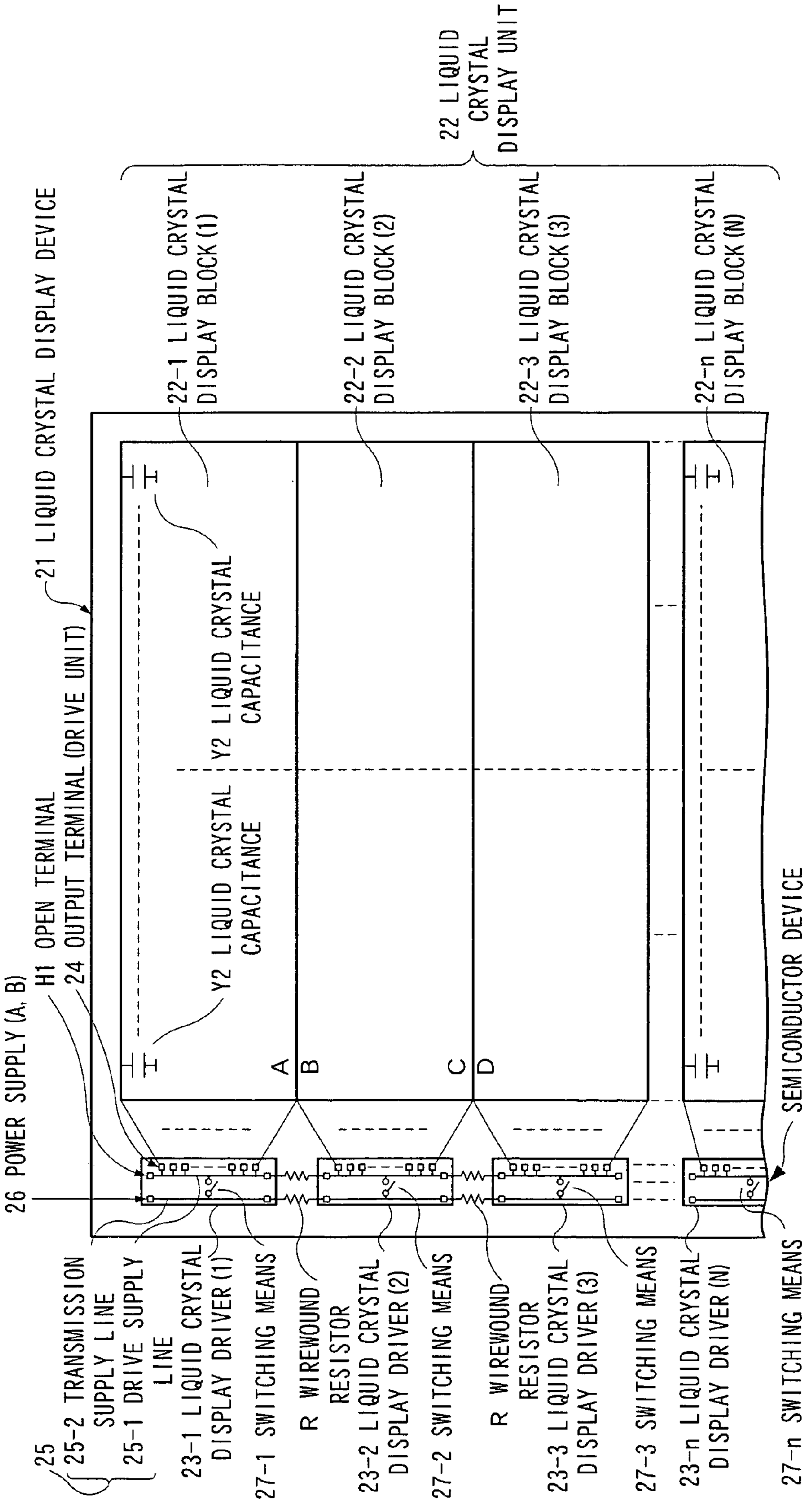
FIG. 2 is an equivalent circuit diagram showing a constitution of a liquid crystal display device that uses a semiconductor device according to the embodiment of the present invention.
Figures 3A, 3B:
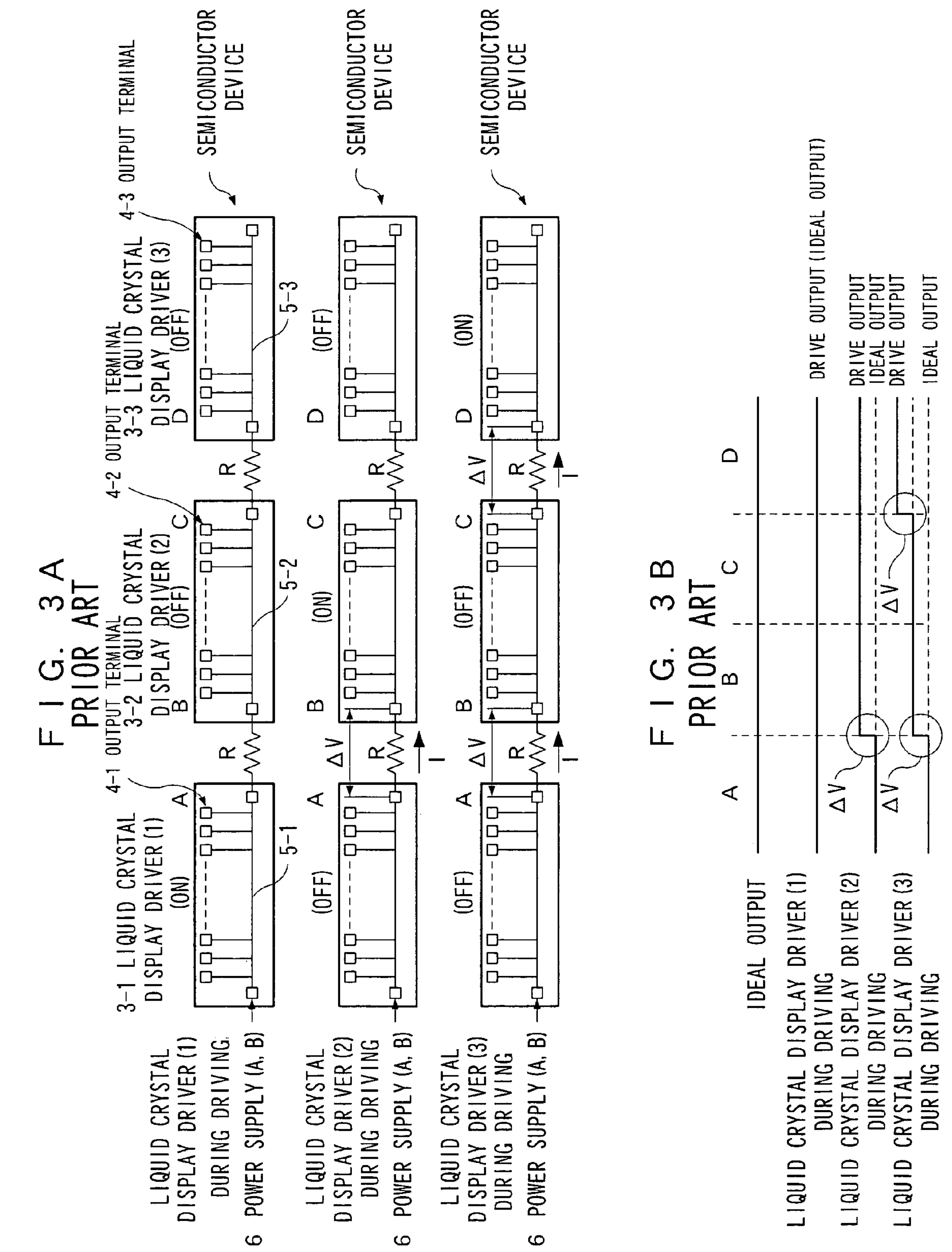
FIG. 3A PRIOR ART
FIG. 3B PRIOR ART
FIG. 3A is a connection conceptual view showing an operation of the conventional semiconductor device.
FIG. 3B is a waveform diagram showing the operation of the conventional semiconductor device.
Figure 4A:
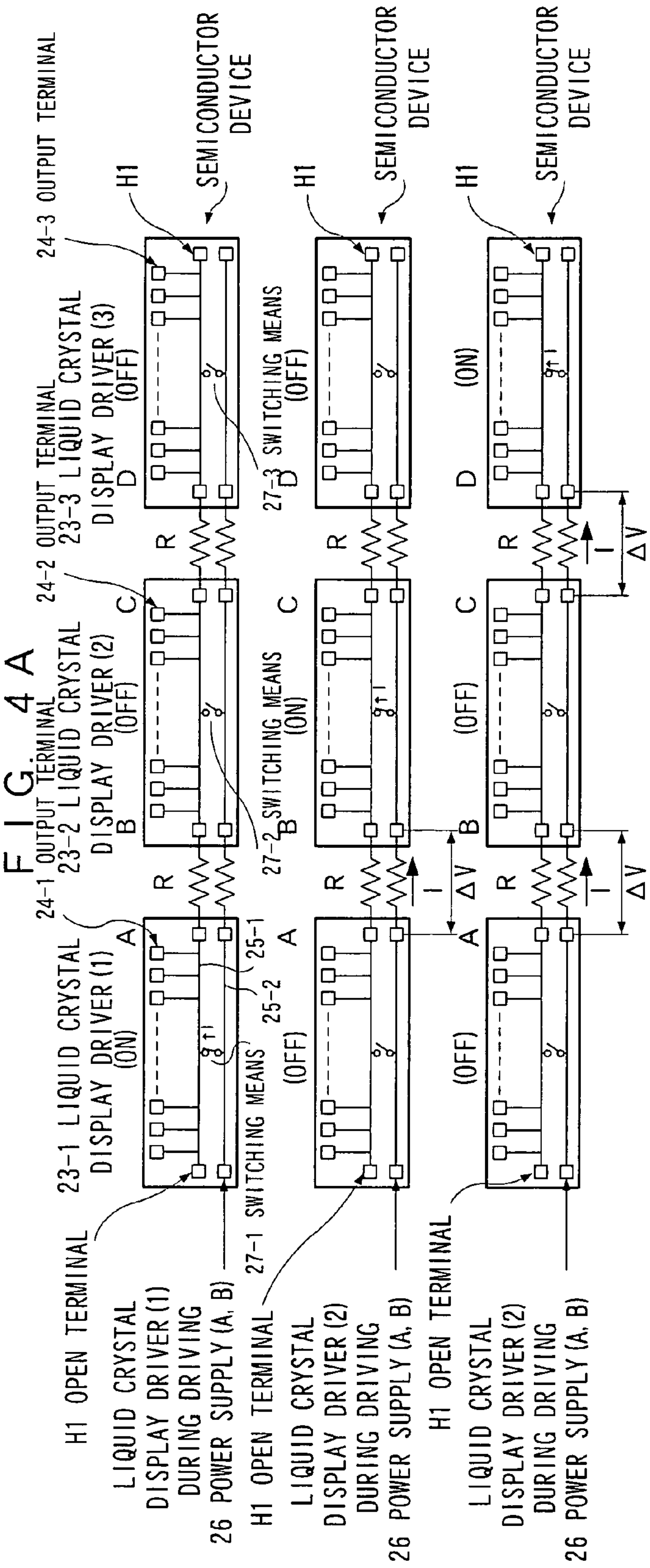
FIG. 4A is a connection conceptual view showing an operation of the semiconductor device according to the embodiment of the present invention.
Figure 4B:
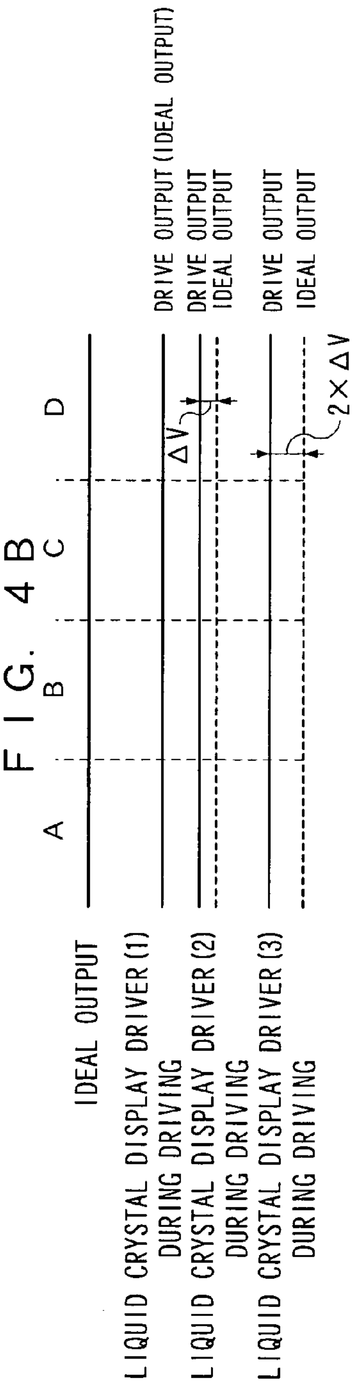
FIG. 4B is a waveform diagram showing the operation of the semiconductor device according to the embodiment of the present invention.

FIG. 2 is an equivalent circuit diagram showing the constitution of a liquid crystal display device that uses the semiconductor device of the embodiment, and represents, as the semiconductor device of this embodiment, a case where a plurality of liquid crystal display drivers (drivers) mounted by the COG method is constituted by means of a cascade connection. Further, FIGS. 4A and 4B are a connection conceptual view and a waveform diagram each showing the operation of the semiconductor device of this embodiment, in which FIG. 4A is a circuit diagram that shows the constitution of a semiconductor device of this embodiment. Here, three liquid crystal display drivers are constituted by means of a cascade connection. Further, FIG. 4B is a waveform diagram that shows the state of a drive signal that is output by each liquid crystal display driver of the semiconductor device of this embodiment.

With regard to the semiconductor device of this embodiment, as shown in FIGS. 2 and 4, basically, arranged in the liquid crystal display device 21, whose liquid crystal display unit 22 is the load, is a plurality of liquid crystal display drivers (1) 23-1 to (N) 23-*n*, which are each connected to drive each liquid crystal display block of liquid crystal display blocks (1) 22-1 to (N) 22-*n* that are operationally separated to form a plurality. Each liquid crystal display driver 23 is formed having an output terminal 24 that outputs a drive signal for driving the liquid crystal display unit 22 in liquid crystal display blocks (although not illustrated, this output terminal comprises a drive unit that generates a drive signal), and supply wiring 25 for supplying a power supply (A, B) 26 allowing the drive unit to generate a drive signal. The constitution is such that these liquid crystal display drivers 23 are cascade-connected such that the supply wiring 25 is sequentially connected via wirewound resistors R, and, as a result of the mutual cascade connection between the liquid crystal display drivers, the power supply (A, B) 26 is supplied to the subsequent-stage liquid crystal display drivers via the wirewound resistors R between the liquid crystal display drivers 23. Further, the supply wiring 25 is formed in each of the plurality of liquid crystal display drivers (1) 23-1 to (N) 23-*n* so that the terminal formed at one end of a liquid crystal display driver and the terminal formed at the opposite end are directly connected.

Further, the semiconductor device comprises a drive supply line 25-1, which is directly connected to the drive unit in order to provide a power supply when a drive signal is output from the drive unit to each output terminal 24, and a transmission supply line 25-2 for transmitting the power supply supplied to the drive supply lines 25-1 throughout the plurality of liquid crystal display drivers 23, further comprising switching means 27 that turns the connection between the drive supply line 25-1 and the transmission supply line 25-2 ON/OFF for each of the liquid crystal display drivers. The semiconductor device is constituted such that, of the plurality of liquid crystal display drivers 23, only the switching means 27 provided in the liquid crystal display drivers 23 during a drive operation is turned ON. Here, there is no need for the whole plurality of liquid crystal display drivers to be provided with the switching means 27, it being sufficient to equip at least two liquid crystal display drivers with the switching means 27. In this case, liquid crystal display drivers other than the at least two liquid crystal display drivers need not be used to drive the liquid crystal display block. In the description that follows, a semiconductor device in which the whole plurality of liquid crystal display drivers is equipped with switching means 27 is described in order to simplify the description.

Further, a switching element formed by a semiconductor, or the like, can be used as the switching means 27, for example. As switching elements formed by semiconductors, n-type channel MOS transistors, p-type channel MOS transistors, and bipolar-type transistors, and so forth, are known. However, depending on the characteristics of the constituent switching element, the ON and OFF operation of the switching element may be suitably controlled. Further, endpoint node H1 of the drive supply line 25-1 shown in FIG. 2 is in a state of not being connected to any other terminal and is therefore open, and the other end point node (not shown) of the drive supply line 25-1 is also an open terminal. Here, an open terminal can be implemented by the present invention as long as same is substantially open and includes cases where a state of high-impedance arises.

The operation of a semiconductor device that is constituted as described above will be described below.

Figure 5:
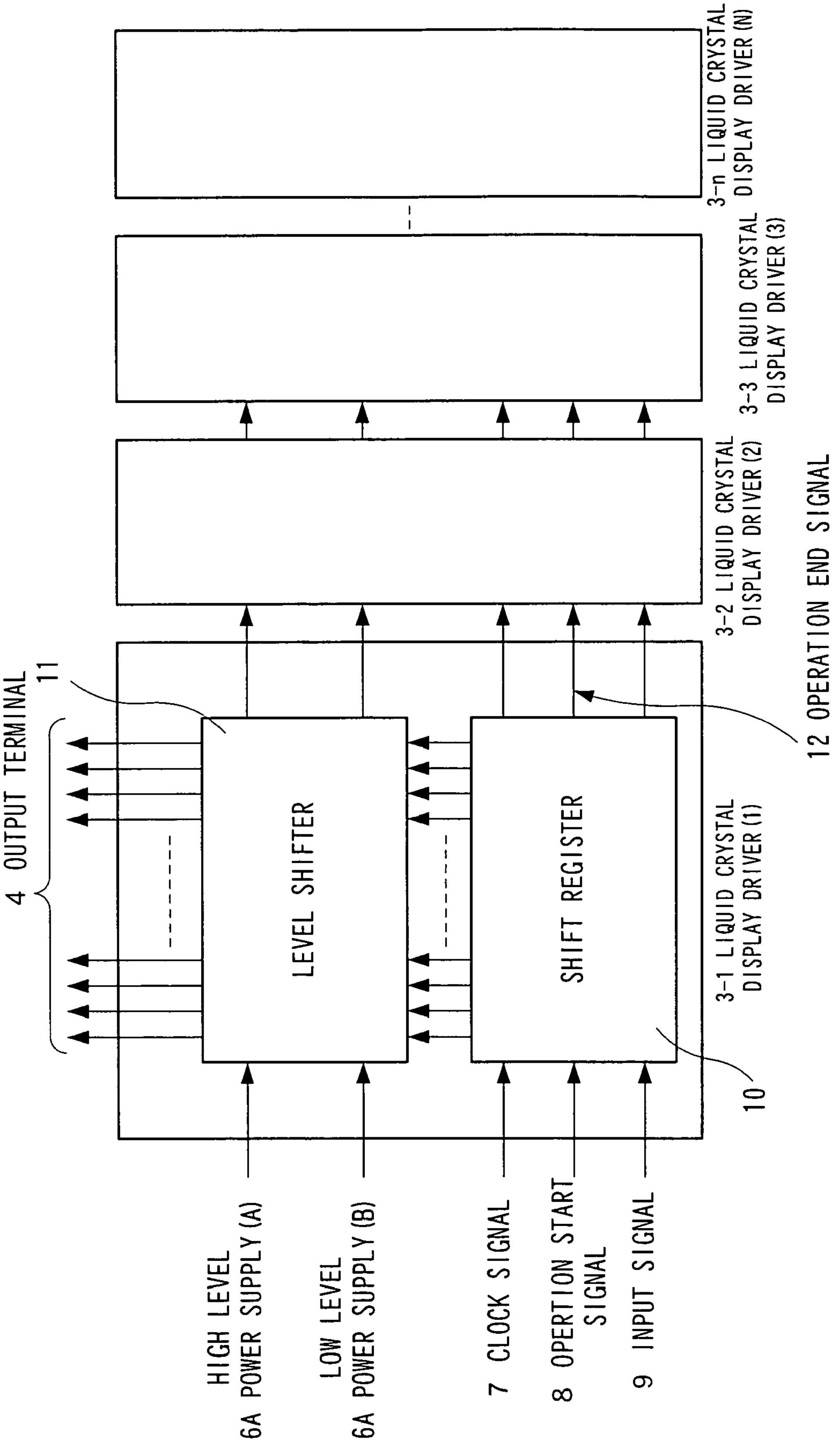
FIG. 5 PRIOR ART
FIG. 5 is a block diagram showing an internal constitution of a liquid crystal display driver of the conventional semiconductor device.

First, as an initial state, the switching means 27, which connects the drive supply line 25-1 and the transmission supply line 25-2 of all the cascade-connected liquid crystal display drivers 23, is in the OFF state. The control signal of the switching means 27 is generated by the shift register 10 shown in FIG. 5. That is, the operating state of the liquid crystal display drivers 23 can be judged from the operation start signal 8 and the operation end signal 12 that is output after the operation start signal 8 has been input to the shift register 10 and sequentially transferred to the shift register 10. Hence, the control signal is generated based on these signals and the switching means 27 can be controlled by means of the control signal.

When the operation start signal 8 is input to the liquid crystal display driver (1) 23-1, the switching means 27-1 of the liquid crystal display driver (1) 23-1 enters the ON state, as shown in FIG. 4A. Next, the operation end signal 12 is output by the liquid crystal display driver (1) 23-1 and input as the operation start signal 8 of the subsequent-stage liquid crystal display driver (2) 23-2. As a result, the switching means 27-1 of the liquid crystal display driver (1) 23-1 enters the OFF state and the switching means 27-2 of the liquid crystal display driver (2) 23-2 enters the ON state.

Similarly, when the operation end signal 12 is output by the liquid crystal display driver (2) 23-2, the operation end signal 12 is input as the operation start signal 8 of the liquid crystal display driver (3) 23-3, and the switching means 27-2 of the liquid crystal display driver (2) 23-2 then enters the OFF state and the switching means 27-3 of the liquid crystal display driver (3) 23-3 enters the ON state. Here, the switching means 27-1 of the liquid crystal display driver (1) 23-1 retains the OFF state.

As detailed above, as shown in FIG. 2, when the drive supply line 25-1, whose two terminals are open terminals, and the transmission supply line 25-2 are connected by the switching means, a plurality of liquid crystal display drivers 23 is cascade-connected so that the supply wiring 25 of each of the liquid crystal display drivers 23 is sequentially connected. When liquid crystal display blocks 22 are driven by the liquid crystal display drivers 23, only the switching means 27 provided in the liquid crystal display drivers 23 that perform the drive operation enters the ON state, and, hence, the precharge/discharge current from the liquid crystal capacitance Y in the liquid crystal display unit 2 thus driven flows to the transmission supply line 25-2 via the output terminals 4 and switching means 27. Therefore, the drive supply line 25-1 can be held at the same potential by removing the current path.

As a result, there is no longer discontinuity in the potential between the liquid crystal drive blocks 22 when no drive is taking place and the same no-drive potential can be supplied to the whole of the undriven liquid crystal display unit. The display variation that arises from the display variation when no driving is taking place can therefore be suppressed. Here, because a current then flows in the wirewound resistors R between the liquid crystal display drivers of the transmission supply line 25-2, a potential difference is generated in these wirewound resistors R, meaning that the non-drive operating potential itself changes according to the location of the liquid crystal display driver during the drive operation. However, because there is no discontinuity in the potential between liquid crystal display blocks, it may be considered that this change in the non-drive operating potential is imperceptible.

Moreover, although an operation in which three liquid crystal display drivers are cascade-connected was described in this embodiment, this elimination of a potential difference is possible in all cases where a plurality of liquid crystal display drivers is cascade-connected.

What is claimed is:

1. A semiconductor device comprising:

a plurality of drivers for outputting a drive signal for driving a load, said plurality of drivers being sequentially connected;

a first supply wiring connected so that the plurality of drivers are sequentially cascade-connected, said first supply wiring connected to an output terminal of a drive unit, said output terminal for outputting a drive signal to a load;

a second supply wiring connected so that the plurality of drivers are sequentially cascade-connected for receiving power from a power source connected to the second supply wiring; and switching means for connecting the first supply wiring and second supply wiring during a drive operation, such that when the first and second supply wirings are disconnected, no electricity flows through the first supply wiring.

2. The semiconductor device according to claim 1, wherein all of the plurality of drivers comprise the switching means.

3. The semiconductor device according to claim 1, wherein the drivers first supply wiring is open at the two ends of the two drivers at the ends of the cascade-connection.

4. The semiconductor device according to claim 1, further comprising a power supply wiring for supplying a power supply to the second supply wiring of at least one of the plurality of drivers.

5. The semiconductor device according to claim 1, wherein regions of the first supply wiring and the second supply wiring between the drivers comprise resistive components.

6. The semiconductor device according to claim 1, wherein the at least two drivers provided with the switching means comprise a drive unit that is connected to the first supply wiring for generating a drive signal in accordance with a supply voltage supplied to the first supply wiring via the second supply wiring and the switching means.

7. The semiconductor device according to claim 1, wherein the switching means includes a semiconductor switching element.

8. A driver that outputs a drive signal for driving a load, said driver comprising:

a first supply wiring for directly supplying a drive signal output supply;

a second supply wiring for supplying to the first supply wiring a power to obtain the drive-signal output supply; and switching means that turns ON and OFF the connection between the first supply wiring and the second supply wiring.

9. The driver according to claim 8, wherein the switching means includes a semiconductor switching element.

10. The driver according to claim 8, further comprising a drive unit that is connected to the first supply wiring for generating a drive signal in accordance with a supply voltage supplied to the first supply wiring via the second supply wiring and the switching means.

11. The driver according to claim 8, wherein the switching means is turned ON in accordance with an instruction to output the drive signal.

12. The driver according to claim 8, wherein the first supply wiring is for providing a direct connection between a first open terminal and a second open terminal within the driver.

13. The driver according to claim 8, wherein the second supply wiring is constituted to provide a direct connection between a first supply terminal and a second supply terminal that are formed in positions spaced apart within the driver that neighbor the two ends thereof.

* * * * *